Patented Mar. 13, 1934

1,950,907

UNITED STATES PATENT OFFICE 1,950,907

CELLULOSE ORGANIC ESTER COMPOSITION COMPRISING A PHTHALIC ACID ESTER OF A MONOETHER OF HYDROQUINONE

Cyril J. Staud and Thomas F. Murray, Jr., Rochester, N. Y., assignors to Eastman Kodak Company, Rochester, N. Y., a corporation of New York No Drawing. Application July 29, 1932, Serial No. 626,218

17 Claims. (Cl. 91—68)

This invention relates to cellulose organic ester compositions. One of its objects is to provide new and useful compositions of matter. Another object is to provide filters for the absorption of ultraviolet light. Another object is to provide lacquers or overcoatings which absorb substantially all the ultra-violet light which would have a deleterious effect upon the underlying surface. Another object is to provide cellulose acetate lacquers which, having been applied over a nitrocellulose lacquer, absorb many of the light rays which have a decomposing effect upon nitrocellulose. Still another object of our invention is to provide cellulose organic ester sheets having a crystalline or nacreous appearance, such as are useful in the manufacture of toilet articles, novelties, etc. Other objects will hereinafter appear.

It is a well known fact that nitrocellulose lacquers lose their gloss with relatively great rapidity when exposed to the elements. The de-lustering and decomposition of nitrocellulose lacquer surfaces, while to some extent due to inclement weather conditions, is primarily due to the ultra-violet rays from the sun, which penetrate and decompose the surface layer.

While the addition of pigments and plasticizers to nitrocellulose compositions aids to a slight extent in rendering a nitrocellulose layer used as an outer coating less affected by the ultra-violet light, the protection they afford is not by any means complete. Even with a considerable amount of these constituents present in the lacquer, there is nevertheless, upon the surface, a goodly proportion of cellulose nitrate directly exposed to the solar radiation. Moreover, it has been found that under such conditions the exposed cellulose nitrate will be decomposed by the ultra-violet light falling upon its surface.

It has previously been proposed to protect cellulose nitrate lacquers from ultra-violet light by overcoating them with cellulose acetate lacquers, as in the application of Paul C. Seel, Serial No. 425,353. Cellulose acetate of itself does not decompose appreciably under the influence of ultraviolet light. However, it will not fully protect an under layer of cellulose nitrate over which it may be coated, for the reason that it does not completely absorb those light rays which decompose the nitrate. When, however, small quantities of certain substances which themselves have the property of absorbing ultra-violet light are incorporated in cellulose acetate lacquer compositions, the coatings produced from these lacquers are very effective in protecting underlying nitrocellulose coatings from ultra-violet light.

We have discovered that cellulose acetate compositions which contain small percentages of a phthalic acid neutral ester of a monoether of hydroquinone have the property of inhibiting the passage of ultra-violet light. The method of preparing these esters is described in our co-pending application Serial No. 626,217, filed of even date herewith, in which these compounds and a method of preparing them are claimed. As examples of the phthalic acid neutral esters of monoethers of hydroquinone which we may employ in our novel compositions of matter, we may mention the phthalic acid neutral ester of the monomethyl ether of hydroquinone, and the phthalic acid neutral ester of the monobenzyl ether of hydroquinone, although it will be obvious that we may also use the neighboring homologues of these compounds, such, for instance, as the phthalic acid neutral esters of the monoethyl, propyl, etc. ethers of hydroquinone, or the phthalic acid neutral esters of the monotolyl, etc. ethers of hydroquinone.

When added to cellulose acetate lacquers in amounts of 2% or more based on the weight of the cellulose acetate, they effectively protect from ultra-violet light a nitrocellulose or other surface overcoated with the cellulose acetate lacquer. In the case of the phthalic acid neutral ester of the monomethyl ether of hydroquinone, we may even use less than 2%. This compound is a particularly good filter for cutting out ultra-violet light, substantially 100% of the ultra-violet light falling upon it from the sun being absorbed by it.

It is not particularly material what type of vehicle holds the filter, as suitable varnishes, gums, waxes, shellacs, etc. are for some purposes as useful as cellulose acetate as vehicles in which to incorporate the phthalic acid ester. Nor should we be understood to restrict ourselves to cellulose acetate specifically as a cellulose derivative vehicle for a light-filtering overcoating. There are numerous other esters of cellulose, such as cellulose propionate, cellulose butyrate, cellulose acetate-propionate, cellulose acetate-benzoate, cellulose nitro-acetate, cellulose phospho-acetate, etc., many of which are useful as vehicles in which to incorporate the filter for use as an overcoating. In selecting the vehicle it must, of course, be borne in mind that only those substances are suitable which are themselves not as rapidly decomposed as the subcoating which they are used to protect.

Our novel overcoating lacquers may be prepared in the following manner, although any method which uniformly disperses the light-filtering substance throughout the vehicle used may generally be employed. Cellulose acetate, for example, may be mixed with approximately 3% of its weight of the phthalic acid neutral ester of the monomethyl or monobenzyl ether of hydroquinone with or without the addition of say up to 50% of a suitable plasticizer. This mixture may then be dissolved in a suitable solvent or solvent mixture, such as one made up of 15% ethyl acetate, 50% acetone, 20% ethyl lactate and 15% denatured alcohol, approximately one gallon of this solvent being required for 20 ounces of cellulose acetate. This example is given merely to acquaint those skilled in the art with one manner of incorporating the filter, and we are not to be limited by the details or proportions of this example except as may be indicated by the appended claims.

The term overcoating, and the description of these overcoatings in connection with lacquers, are to be understood broadly rather than specifically, as it will be apparent that the value of our invention lies in the fact that by interposing, between the cellulose nitrate layer and the source of the ultra-violet rays, a vehicle containing the ultra-violet light filter, the nitrate underlayer will be protected from decomposition and deterioration. Thus, the cellulose acetate overcoating may consist of an already formed sheet containing the filter, which sheet is interposed between the cellulose nitrate sheet to be protected and the source of the ultra-violet light. Furthermore, in the case of laminated glass, for instance, the cellulose derivative reinforcement interposed between the glass laminations may consist of a cellulose nitrate interlayer on either side of which is coated, or otherwise imposed, a layer or coating of a vehicle such as cellulose acetate with which has been incorporated an ultra-violet light filter. Thus, even though the cellulose nitrate interlayer be covered on both sides with glass, it is first covered with a vehicle containing an ultra-violet light filter, so that the cellulose nitrate is protected from decomposition by the ultra-violet light which would otherwise penetrate the cellulose nitrate and decompose it. Thus, the term overcoating used in this specification and the appended claims is not to be confined to a mere lacquer top coat, but is to be construed broadly as any shielding layer containing an ultra-violet filter for preventing decomposition of cellulose nitrate by ultra-violet light, or for protecting any surface or substance from ultra-violet light.

We have discovered further that cellulose organic ester sheets having a beautiful crystalline appearance may be made from compositions comprising a cellulose organic ester and the phthalic acid neutral ester of the monobenzyl ether of hydroquinone. In order to produce crystalline effects in cellulose ester sheets, a substance is introduced into the cellulose ester solution from which the sheets are to be cast, which substance is of low solubility in the cellulose ester solvent used in making the solution. As the solvent evaporates, the substance crystallizes out in the sheet. The crystal form is characteristic of the substance used as crystallizing agent. In order to give a beautiful effect, the crystal form should be well defined, and the crystals should impart a soft sheen to the cellulose ester sheet. While flexibility such as is required in motion picture film is not necessary in these decorative sheets, the crystallizing agent should not be a substance which causes actual brittleness of the sheet. The solubility of the phthalic acid neutral ester of the monobenzyl ether of hydroquinone in acetone is approximately 2.72 g. per 100 cc.

In order that those skilled in the art may better understand this part of our invention, we would state, by way of illustration, that for the manufacture of sheets with a crystalline appearance, our new composition of matter may be compounded as follows: 6.8 g. of the phthalic acid neutral ester of hydroquinone monobenzyl ether is dissolved in 250 cc. of acetone. 50 g. of acetone-soluble cellulose acetate, i. e. cellulose acetate containing from 36% to 42% acetyl radical, approximately, is dissolved with stirring at atmospheric temperature in this solution. Compositions of matter prepared as described may be deposited upon any suitable film-forming surface to form films or sheets, in a manner well known to those skilled in the art. Other solvents (instead of acetone) which are compatible with the cellulose acetate and in which the phthalic acid neutral ester of hydroquinone monobenzyl ether has only a limited solubility may also occur to those skilled in this art. In like manner the phthalic acid neutral ester of hydroquinone monobenzyl ether may be compounded with other single organic esters of cellulose, such as cellulose propionate, butyrate and the like, or with mixed organic esters, such as cellulose aceto-stearate, cellulose aceto-propionate, or cellulose aceto-malate, a suitable solvent which will dissolve the cellulose ester and in which the phthalic acid neutral ester of hydroquinone monobenzyl ether shows only a limited solubility employed.

What we claim as our invention and desire to be secured by Letters Patent of the United States is:

1. A composition of matter comprising a cellulose organic ester and a phthalic acid neutral ester of a monoether of hydroquinone.

2. A composition of matter comprising cellulose acetate and a phthalic acid neutral ester of a monoether of hydroquinone.

3. A composition of matter comprising cellulose acetate and the phthalic acid neutral ester of hydroquinone monomethyl ether.

4. A composition of matter comprising cellulose acetate and the phthalic acid neutral ester of hydroquinone monobenzyl ether.

5. A cellulose organic ester sheet comprising crystallized phthalic acid neutral ester of hydroquinone monobenzyl ether.

6. A cellulose acetate sheet comprising crystallized phthalic acid neutral ester of hydroquinone monobenzyl ether.

7. An article of manufacture having a light-filtering overcoating comprising an organic ester of cellulose and a phthalic acid neutral ester of a monoether of hydroquinone.

8. An article of manufacture having a light-filtering overcoating comprising cellulose acetate and a phthalic acid neutral ester of a monoether of hydroquinone.

9. An article of manufacture having a light-filtering overcoating which comprises cellulose acetate, a plasticizer, and a phthalic acid neutral ester of a monoether of hydroquinone.

10. An article of manufacture having a cellulose nitrate coating with a light-filtering overcoating of cellulose acetate containing a phthalic acid neutral ester of a monoether of hydroquinone.

11. An article of manufacture having a cellulose nitrate coating with an overcoating of cellulose acetate containing at least 2%, based upon the weight of the cellulose acetate, of a phthalic acid neutral ester of a monoether of hydroquinone.

12. An article of manufacture having a light-filtering overcoating comprising cellulose acetate and the phthalic acid neutral ester of hydroquinone monomethyl ether.

13. An article of manufacture having a light-filtering overcoating comprising cellulose acetate and the phthalic acid neutral ester of hydroquinone monobenzyl ether.

14. An article of manufacture having a light-filtering protective covering comprising a cellulose acetate overcoating containing the phthalic acid neutral ester of hydroquinone monomethyl ether, superimposed upon a cellulose nitrate coating.

15. An article of manufacture having a light-filtering protective covering comprising a cellulose acetate overcoating containing the phthalic acid neutral ester of hydroquinone monobenzyl ether, superimposed upon a cellulose nitrate coating.

16. An article of manufacture having a cellulose nitrate coating with an overcoating of cellulose acetate containing at least 1% of the phthalic acid neutral ester of hydroquinone monomethyl ether, based upon the weight of the cellulose acetate.

17. An article of manufacture having a cellulose nitrate coating with an overcoating of cellulose acetate containing at least 2% of the phthalic acid neutral ester of hydroquinone monobenzyl ether, based upon the weight of the cellulose acetate.

CYRIL J. STAUD.
THOMAS F. MURRAY, Jr.